(12) United States Patent
Feng et al.

(10) Patent No.: US 11,974,191 B2
(45) Date of Patent: Apr. 30, 2024

(54) METHOD OF AND A NODE DEVICE FOR ALERTING NODE DEVICES IN A NETWORK OF OPERATIVELY INTERCONNECTED NODE DEVICES

(71) Applicant: SIGNIFY HOLDING B.V., Eindhoven (NL)

(72) Inventors: Lei Feng, Shanghai (CN); Chang Jie Wang, Shanghai (CN); Gong Ming Wei, Minhang Qu (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 121 days.

(21) Appl. No.: 17/788,320

(22) PCT Filed: Dec. 15, 2020

(86) PCT No.: PCT/EP2020/086237
§ 371 (c)(1),
(2) Date: Jun. 23, 2022

(87) PCT Pub. No.: WO2021/136653
PCT Pub. Date: Jul. 8, 2021

(65) Prior Publication Data
US 2023/0020510 A1    Jan. 19, 2023

(30) Foreign Application Priority Data

Jan. 2, 2020  (WO) ............... PCT/CN2020/070150
Feb. 13, 2020  (EP) .................................... 20157183

(51) Int. Cl.
*H04W 4/029*        (2018.01)
*H05B 47/115*       (2020.01)
*H05B 47/175*       (2020.01)

(52) U.S. Cl.
CPC .......... *H04W 4/029* (2018.02); *H05B 47/115* (2020.01); *H05B 47/175* (2020.01)

(58) Field of Classification Search
CPC .... H04W 4/029; H05B 47/115; H05B 47/175
See application file for complete search history.

(56) References Cited

U.S. PATENT DOCUMENTS

| | | |
|---|---|---|
| 8,295,705 B2 | 10/2012 | Kim et al. |
| 10,251,073 B2 | 4/2019 | Morchon et al. |

(Continued)

FOREIGN PATENT DOCUMENTS

| | | |
|---|---|---|
| EP | 2845449 A1 | 3/2015 |
| WO | 2013164772 A1 | 11/2013 |
| WO | 2017089199 A1 | 6/2017 |

OTHER PUBLICATIONS

Arpita Deshmukh, et al., "Energy Efficient Dynamic Street Lighting System", Proceedings of the 2nd International Conference on Electronics, Communication and Aerospace Technology, 2018, pp. 254-257.

(Continued)

*Primary Examiner* — Wilson Lee (57) ABSTRACT

A method (50) of, a node device (100) and a computer program product arranged for alerting node devices in a network of operatively interconnected node devices by transmitting an alerting message comprising a geographic location address of an originator node device (21) transmitting the alerting message and a moving direction (12) of an object (11) receiving service from the originator node device (21). When a receiving node device (24, 25) determines, based on its geographic location address, the geographic location address of the originator node device (21) and the moving direction (12), that the object (11) is approaching the receiving node device (24, 25), it transmits the alerting (Continued)

message comprising the geographic location address of the originator node device (21) and the moving direction (12).

15 Claims, 5 Drawing Sheets

(56) References Cited

U.S. PATENT DOCUMENTS

| | | |
|---|---|---|
| 2006/0261979 A1 | 11/2006 | Draaijer et al. |
| 2015/0264776 A1* | 9/2015 | Amarin .............. G06Q 10/0875 |
| | | 315/129 |
| 2015/0319825 A1* | 11/2015 | Destine .................. H05B 47/11 |
| | | 315/153 |
| 2017/0019804 A1 | 1/2017 | Morchon et al. |
| 2017/0084173 A1* | 3/2017 | Kim ......................... G08G 1/07 |
| 2017/0353350 A1 | 12/2017 | Gussen et al. |
| 2021/0180784 A1* | 6/2021 | Leblanc ................ F21V 23/045 |

OTHER PUBLICATIONS

M. Caroline Viola Stella Mary, et al., "Intelligent Energy Efficient Street Light Controlling System Based On IoT For Smart City", International Conference on Smart Systems and Inventive Technology, 2018, pp. 551-554.

\* cited by examiner

METHOD OF AND A NODE DEVICE FOR ALERTING NODE DEVICES IN A NETWORK OF OPERATIVELY INTERCONNECTED NODE DEVICES

CROSS-REFERENCE TO PRIOR APPLICATIONS

This application is the U.S. National Phase application under 35 U.S.C. § 371 of International Application No. PCT/EP2020/086237, filed on Dec. 15, 2020, which claims the benefits of European Patent Application No. 20157183.3 filed on Feb. 13, 2020, and Chinese Patent Application No. PCT/CN2020/070150, filed on Jan. 2, 2020. These applications are hereby incorporated by reference herein.

TECHNICAL FIELD

The present disclosure generally relates to the field of communication in a network of interconnected node devices or terminal devices and, more specifically, to a method of and a node device for alerting node devices in a network of operatively interconnected node devices.

BACKGROUND

Electric or electronic devices, such as lighting devices and Internet of Things, IoT, devices, and devices supporting enhanced Machine-Type Communication, eMTC, for example, all of which comprise data communication capabilities, are frequently deployed in networks comprised of a plurality of such interconnected devices. These devices, generally called node devices or terminal devices, may comprise movable or mobile devices, operating with a wireless network connection, and/or stationary devices, having either or both a wired and/or wireless network connection.

Wireless networks comprised of communicatively interconnected node devices are also called networks in license exempt bands, such as Wireless Mesh Networks, WMNs, Wireless Personal Area Networks, WPANs, and proprietary wireless networks. Networked node devices may communicate data and messages to a remote backend server using a long range communication interface. Furthermore, the node devices may operate a short range communication interface, such as a transceiver module, for communication between node devices only, which is also called inter-node device communication.

The short range communication interface may operate in accordance with a network protocol for exchanging data by networked node devices, such as designated ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), KNX (and KNX based systems), and proprietary communication technologies and protocols, for example.

In the case of a networked lighting system comprising a large number of node devices operating as lighting fixtures, some or even all node devices may be provided with sensors dedicated to or suitable for detecting the presence of a target or an object such as a pedestrian or a vehicle moving along a track, such as a street or a path having the lighting fixtures installed there-along. The inter-node device communication then may be used to alert node devices in the vicinity of the presence of the object such that these node devices may get prepared for providing service to the object, one of which being a light on demand service.

EP2845449A1 relates to for commissioning of nodes of a network, i.e. to determine a neighbour of a node based on correlating a received detection message with sensed parameter. E.g., a reception of a dimming up/down RF message by a pole and a corresponding, simultaneous light change observed by a sensor (camera) in that pole can be used to identify a pole address of the neighbour dimming up/down.

In currently available technologies, such a light on demand application and a mesh network of lighting fixtures are designed separately. As a result, messages are routed based on network addresses of a source node and a destination node, without considering behaviours of the object itself. This can result in inefficient and unreliable transmission of messages and a waste of scarce transmission resources.

Figure 1A:
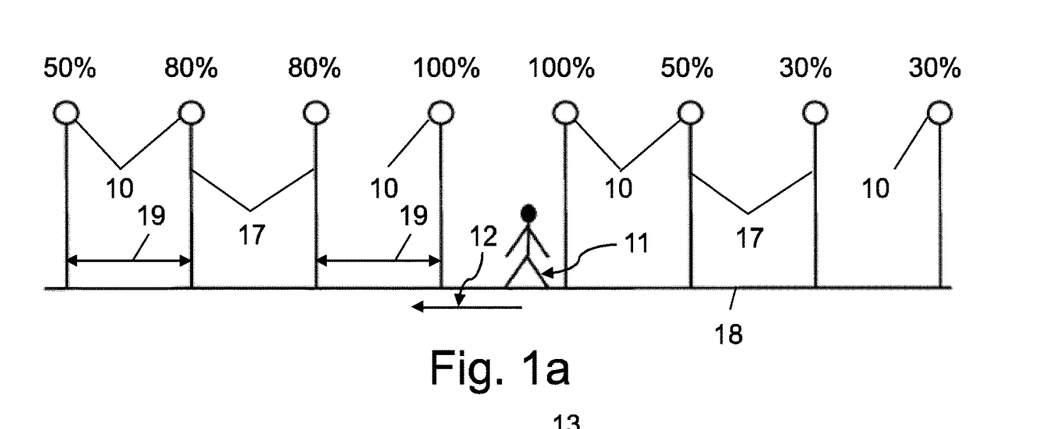
FIGS. 1a to 1c illustrate an embodiment of a simple light on demand application.
Figure 1B:
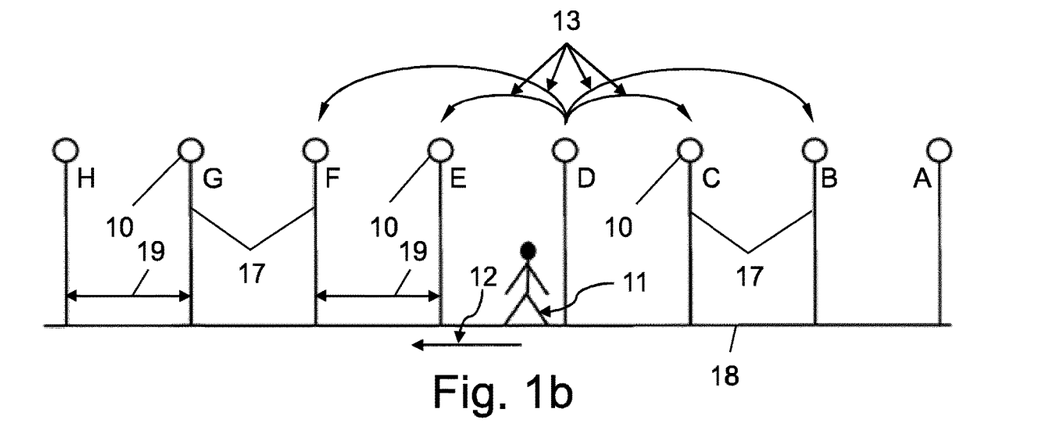
Figure 1C:
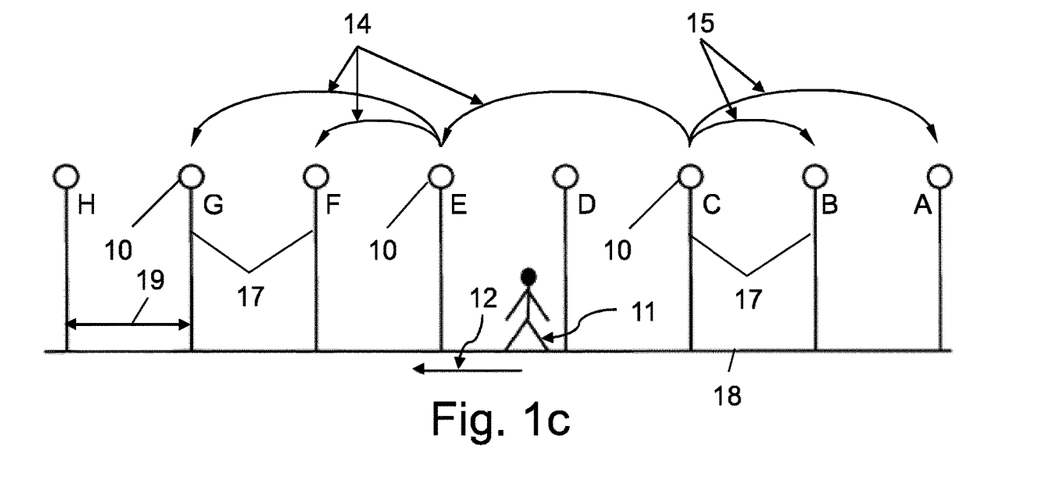

FIGS. 1a to 1c illustrate an embodiment of a simple light on demand application. In FIG. 1a, an object 11 like a human pedestrian is moving along an elongated track, street or path 18 in a direction shown by an arrow 12, i.e. to the left in the drawing. Alongside the track 18 node devices 10 on poles 17 are installed at regular intervals or distances 19 between the poles 17. The node devices 10 comprise lighting fixtures or modules, i.e. street lights, to provide a street lighting service to the moving object 11. Based on presence sensors equipped in the node devices (not shown), a connected street lighting system (not shown) will dim up the lighting modules of the node devices 10, that is the street lights, to provide a high quality lighting environment. For example a light profile as illustrated in FIG. 1 indicating a current light level being a percentage of the total amount of light to be provided by a particular node device 10. Usually, more lighting devices 10 in the moving direction 12 of the object 11 are dimmed up and at a higher level than in the opposite direction.

To enable the light on demand application, a local area network, LAN, is used to let adjacent lighting devices know that the pedestrian 11 is approaching and the relevant light profile should be prepared, by transmitting a respective notification message.

FIG. 1b provides an example of a flooding-based mesh network for transmitting messages. That is, each node device 10 is arranged to transmit and receive messages via a short-range communication interface as disclosed above (not shown).

Assume that in the example of FIG. 1b, a presence sensor on node device D detects the object 11. In order to create the lighting environment as illustrated in FIG. 1a, node device D needs to notify the node devices E,F,G,H that there is an object detected that requires a lighting service. Further assume that the wireless communication reach of one hop of the short-range communication interface of the node devices 10 is two times a pole interval 19. That is, a message transmitted 13 by node device D can be received by node devices B,C,E,F.

Upon receiving the message transmitted 13 by node device D, the node devices B,C,E,F will relay 14, 15 the message to other node devices along the road. FIG. 1c, for clarity sake, only shows node devices C and E relaying the message. Actually, node devices B and F will relay the message in a same way as node devices C and E do, and so on.

In this light on demand application it is, for example, meaningless to relay 14 the message downstream of the moving direction 12, i.e. to the left in the drawing, by node device C. Node device F, for example, receives the message directly 13 from node device D but also in relay 14 from node device E. Hence, both in downstream and upstream direction, i.e. to the right in the drawing, of the moving object 11 multiple messages are unnecessary relayed 14, 15, thereby wasting scarce transmission resources such as bandwidth and energy, which also may introduce interference in the network.

Accordingly, there is a genuine need for a more efficient method of transmitting or relaying messages to node devices in a network of interconnected node devices providing service to a moving object.

SUMMARY

In a first aspect of the present disclosure, there is presented a method of alerting node devices in a network of operatively interconnected node devices by transmitting an alerting message, the alerting message related to a service to be provided by the node devices to a moving object, each node device comprising a geographic location address of the node device, the method comprising the steps of:
- receiving, by a node device, an alerting message comprising a geographic location address of an originator node device transmitting the alerting message and a moving direction of the object receiving service from the originator node device;
- determining, by the receiving node device, based on its geographic location address, the geographic location address of the originator node device and the moving direction, whether the object is approaching the receiving node device, and
- transmitting, by the receiving node device, the alerting message comprising the geographic location address of the originator node device and the moving direction if it is determined that the object is approaching the receiving node device.

The present disclosure proposes a method that enhances a message relay strategy by a node device in a network of interconnected node devices that provide a service to an object or target in the network, such as a mesh network, by considering the moving direction of the object or target moving along the node devices.

An alerting or notifying message is transmitted by an originator node device in the network for alerting other node devices of the presence of the object, such that these node devices may prepare or get the service to be provided to the object ready before the object actually arrives at the geographic location of these node devices. The inclusion of the moving direction of the object in the alerting message enables a node device receiving the alerting message to determine whether the object is approaching the same node device. The receiving node device only transmits the alerting message when the object is moving towards or approaching the node device, while other node devices receiving the alerting message will not relay the received alerting message.

The method of the present disclosure therefore reduces meaningless transmission of messages in the network, which in turn avoids wasting of bandwidth and interferences between messages. The network as a whole operates therefore more efficiently and reliably, which is especially of importance in a license exempt mesh network. Less transmissions also reduce communication costs as well as power consumption involved with the transmission of messages.

As an example, when the network is a lighting on demand system comprising interconnected lighting devices arranged along a track or road, the total number of messages transmitted in the system for preparing and creating a lighting pattern by the lighting devices in response to the detection of an object such as a car or pedestrian along the road may be reduced in the system according to the present disclosure by a maximum of 50% compared to the lighting on demand system discussed above with respect to FIGS. 1a-c, for example, as those lighting devices that the object moves away from will not transmit the alerting message.

In an embodiment of the present disclosure, wherein the node devices are arranged along at least one track, the method further comprising a step of updating, in the alerting message, by a receiving node device, the geographic location address of the originator node device and the moving direction of the object when the receiving node device determines that the object moves in a different direction than indicated in the received alerting message.

Especially for a street lighting network, the lighting devices may be arranged along various roads or tracks extending in various directions. In the case that the object moves from a first track having light devices along it to a different second track extending in a different direction, the moving direction of the object changes.

Against this background, a receiving node device has to update in the alerting message the geographic location address of the originator node device and the moving direction of the object. In particular, a geographic location address of a receiving node device detecting the presence of the object and the moving direction of the object along the second track will be included in the alerting message.

This ensures that an object moving along the track(s) having node devices arranged there-along receives the required service, such as street lighting, available from the node devices when moving along a track, as the alerting message always comprises up-to-date information as regard to the moving direction of the object, while preventing transmission of unnecessary messages.

In an embodiment of the present disclosure, the alerting message is generated by the originator node device and/or updated by a receiving node device in response to detection of the object by a sensor of the originator node device or the receiving node device.

The node devices may comprise a presence detection device such as a presence detection sensor including a passive infrared sensor, PIR, or a microwave motion sensor having a radar device that can detect a position or the presence of the object. The moving direction of the object may be detected by the presence sensor by relying on its own outputs, such as the outputs from a radar, or by estimation based on presence detection output of adjacent node devices. Those skilled in the art will appreciate that other sensor devices may be used for detecting the presence of an object such as a sound detection sensor, a temperature measurement sensor, a camera operating in the visible and/or infrared spectrum, etc.

It can be contemplated that several node devices may share a same presence detection device, which can detect the presence of the object in an area coving these node devices, for example. This helps to reduce an overall cost of the network.

In practice, a receiving node device provided with a sensor may also operate to generate a new alerting message, upon detecting the presence of the object which moves from a detection range of a sensor equipped with the originator node device to a detection range of the sensor provided with the receiving node device.

In case of the object changes its moving direction, it can be contemplated by those skilled in the art that both approaches, that is, updating the geographic location address of the originator node device and the moving direction of the object in the alerting message received from the originator node device, and generating a new alerting message comprising a geographic location address of the receiving node device and the new moving direction, may serve the purpose of alerting node devices in the moving direction of the imminent approaching of the object.

In an embodiment of the present disclosure, a geographic location address of a node device is obtained from one of a geographic location detection module of the node device and preconfigured data available to the node device.

The geographic location address can be obtained from a geographic location detection module of the node device itself, such as a Global Positioning System, GPS, device or equivalent provided with the node device. On the other hand, the geographic location address may also be available to the node device from a remote backend server or from a cloud device which hold data related to geographic location addresses of all node devices and may provide same to the node device via a network connection upon request, for example. Having the geographic location address stored remotely is advantageous when the node devices themselves have limited storage capacity, while having the geographic location address obtained locally from the location detection module of the node device is an efficient alternative.

In an embodiment of the present disclosure, each node device operates in accordance with a Medium Access Control, MAC, data processing protocol sub-layer, wherein the geographic location address of the originator node device and the moving direction of the object are comprised in at least one of a MAC header and application data of the alerting message for processing by the MAC data processing protocol sub-layer of the receiving node device.

The MAC sub-layer is part of the data link layer defined by the Open System Interconnections, OSI, model that conceptualizes how communications data should be processed between systems.

In contrast to having the alerting message processed as an upper layer message, such as an application layer message in accordance with the OSI model, the reduced traffic in the wireless channel according to method of the present disclosure provides for transmission of the alerting message between node devices in the network as a lower layer message, specifically a MAC sub-layer message.

Transmission of a message from a source node device to a destination node device in a network normally involves the MAC sub-layer and/or the network layer. In particular, for unicast of a message, many wireless mesh networks, like Wi-SUN, both the MAC sub-layer and the network layer are involved in routing of the message. While for broadcast, the network layer usually relies on the MAC sub-layer broadcast to transfer the message from the source node device to the destination node device. That is, the message usually does not go to the network layer for data processing if the message propagates in the same network.

Therefore, in the present disclosure, the implementation, in the MAC layer, of the processing of the alerting message so as to decide whether to transmit the received alerting message is more efficient in terms of usage of computational resources. Overall, the best performance is achieved by processing the alerting message at the lower MAC sub-layer.

Moreover, broadcast packet according to some standards, such as IEEE 802.15.4, is typically handled at the MAC sub-layer. Meanwhile, more and more protocol stacks divide routing functions into multiple layers, such as route-over and mesh-under in 6LoWPAN. Processing of the alerting message in the MAC sub-layer makes it possible to implement the method based on these protocols.

Specifically, the geographic location address of the originator node device and the moving direction of the object may be comprised in a MAC header of a data frame comprising the alerting message. The MAC protocol handler of a receiving node device will process the data frame according to the method of the present disclosure.

As an alternative, the geographic location address of the originator node device and the moving direction of the object may also be put in the application data of the alerting message. In this case, reserved fields in the current MAC header are used to indicate that additional information is provided in the application data. Upon detecting such indication in the MAC header, the MAC protocol handler will get the geographic location address of the originator node device and the moving direction of the object from the application protocol handler of the node device and process the same accordingly.

In a specific embodiment of the present disclosure, the determining step is performed in the MAC data processing protocol sub-layer of the node device.

It can be contemplated by those skilled in the art that the MAC protocol handler of a node device can process the geographic location address of the originator node device and the moving direction of the object, as well as the geographic location address of the node device receiving the alerting message to decide the that the object is approaching the receiving node device. Processing in the MAC sub-layer is more secure in comparison with upper layer processing.

In an embodiment of the present disclosure, the determining step comprises the steps of:
 calculating a propagation direction of the alerting message based on the geographic location address of the originator node and the moving direction of the object, and
 deciding that the receiving node device is downstream of the originator node device along the propagation direction.

Determining that the object is approaching the receiving node device according to this principle is simple and easy to implement, which does not involve heavy calculations or a complicated algorithm, and therefore does not impose a heavy burden on the available resources from the receiving node device.

In an embodiment of the present disclosure, the network is a mesh network, wherein the transmitting step comprises one of flooding and routing of the alerting message.

The mesh network topology is well suited to the present disclosure and both flooding and routing based on the mesh network may be easily applied to transmit the alerting message. There is no additional cost for special hardware or firmware.

In an embodiment of the present disclosure, the alerting message is transmitted to node devices within a pre-set number of hops of the receiving node device.

The transmission range of node devices can be limited, to ensure the quality of communication. It may be designed that the alerting message will be transmitted to a limited number of hops, such as two or three hops. In the case of lighting devices, this can mean up to 6 or 9 lighting devices in one direction along a road, for example.

In an embodiment of the present disclosure, the alerting message further comprises a moving speed of the object, wherein the pre-set number of hops is based on the moving speed of the object.

The moving speed of the object is helpful in deciding how far ahead of the moving object the alerting message should be transmitted. It will be appreciated that for a faster moving object the alerting message should be transmitted further ahead such that the node devices may be prepared before the object arrives.

In an embodiment of the present disclosure, the node devices comprise at least one of smart pole devices and lighting devices, the service from the node device provided to the object comprises at least one of a lighting service, a network access service and a geographic routing service.

Based on the idea of a "smart city", light poles can be "smart" poles comprising various devices, including not only conventional lighting fixtures but also other devices such as access points, a router for example, for data communication or a device for providing geographic routing information to an object moving past a smart pole, which is a convenient and efficient application or use of such a smart pole.

On the other hands, a lighting device in itself, in addition to a luminaire for providing lighting service, may be integrated with other devices providing other services, such as network access function provided by a subscriber identity module, SIM, card or a Zigbee interface, to a passing by object.

In a specific embodiment of a network of interconnected lighting devices, the lighting service comprises providing, by node devices receiving the alerting message, a luminance level dependent on geographic distances between the receiving node devices and the node device transmitting the alerting message.

Based on the present disclosure, the lighting service needs to be prepared in advance, which is realised by having the originator node device sending out the alerting message to all node devices within a pre-set number of hops and ahead of the moving direction of the object. Furthermore, for the purpose of providing comfortable lighting to human eyes, the provided luminance levels from a number of node devices can be adapted, that is, increased or decreased gradually instead of being changed suddenly from off to full level.

For a particular node device, its luminance level may be adjusted, for example, from a lower level to a higher level, as a result of receiving a plurality of alerting messages transmitted or forwarded by each node device in between the originator node device and the particular node device and while the object moves closer to the particular node device.

In this embodiment, the alerting message comprises lighting control commands or instructions for each lighting device receiving the alerting message. The control commands will set an optimized lighting profile for serving the object, which is a pedestrian or a car, for example.

As an example, the lighting profile may be designed allowing a lighting device closer to the object to be dimmed up to a higher luminance level than more distanced lighting devices. This helps to ensure the best use experience while operating the lighting device in an energy efficient manner.

In a second aspect of the present disclosure, there is presented a node device for alerting or notifying node devices in a network of operatively interconnected node devices by transmitting an alerting message according to the method of the first aspect of the present disclosure. In particular, the node device comprises at least one of a smart pole device and a lighting device comprising at least one luminaire.

In an embodiment of the present disclosure, the geographic location address of the originator node device and the moving direction of the object are comprised in at least one of a MAC header and application data of the alerting message for processing by the MAC data processing protocol sub-layer of the node device. Processing at the lower MAC sub-layer is possible in view of the reduced channel usage according to the present disclosure and allows the node device to operate more efficiently in terms of data processing capacity, for example.

In a third aspect of the present disclosure, a computer program product is provided, comprising a computer readable storage medium storing instructions which, when executed on at least one processor, cause the at least one processor to carry out the method according to the first aspect of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

The present disclosure is detailed below with reference to a network of operatively interconnected lighting devices functioning as node devices of the network. Those skilled in the art will appreciate that the present disclosure is not limited to a network of lighting devices, but is applicable for networks of a wide variety of node devices enabled with network communication connectivity, as indicated in the background part.

The terms "node device", "lighting device", "lighting fixture" are used interchangeably in the following description.

Figure 2:
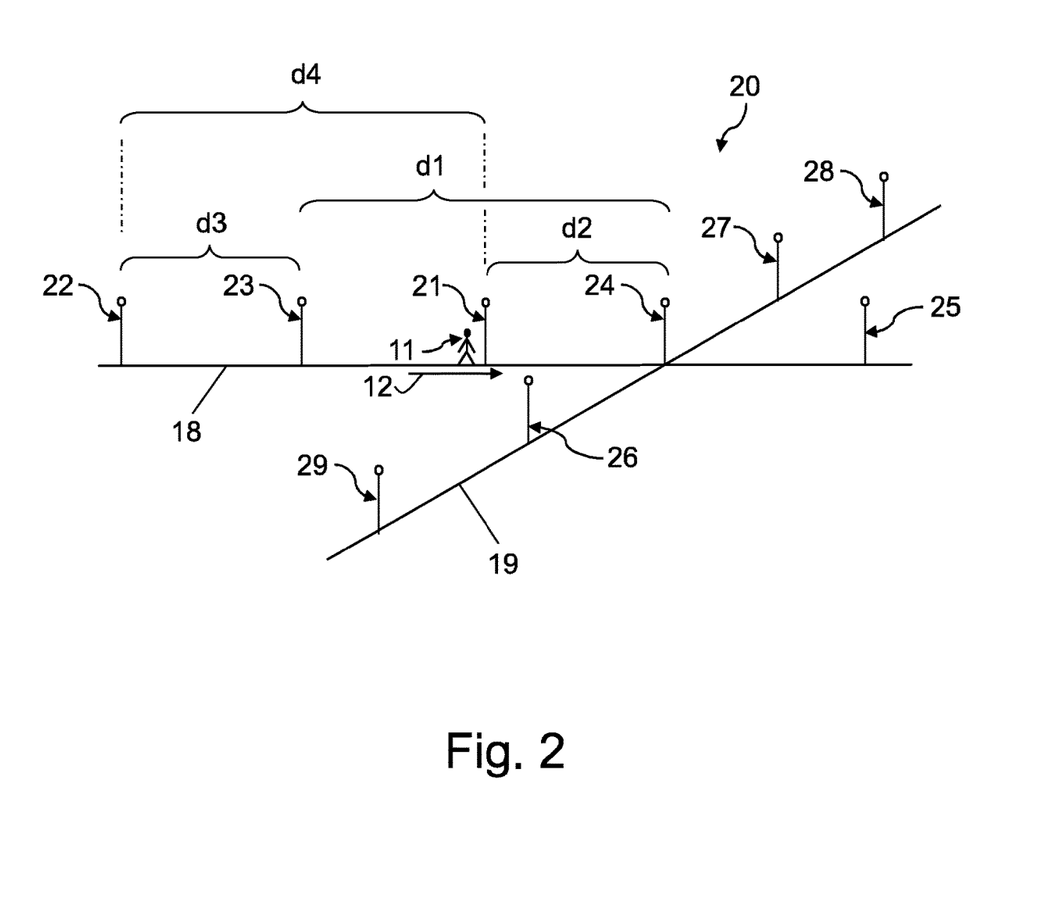
FIG. 2 schematically illustrates another network of lighting devices to be alerted by a method in accordance with the present disclosure.

FIG. 2 schematically illustrates a network 20 of lighting devices in accordance with the present disclosure. For simplicity reasons, it is shown in FIG. 2 that the lighting devices are installed on smart light poles and arranged along two tracks 18, 19 comprising streets, roads or paths, for example. The lighting devices may also be arranged along winding roads or more complicated road layouts. In addition to the lighting devices, there may be other electronic devices installed to the light poles for providing services to an object or target 11 such as a pedestrian or a vehicle passing the light poles.

In this example, track 18 comprises from left to right in the drawing spaced lighting devices 22, 23, 21, 24 and 25. Track 19 crosses track 18 and comprises from the bottom to the top of the drawing spaced lighting devices 29, 26, 24, 27 and 28. Note that lighting device 24 is common to both tracks 18, 19.

One of the lighting devices 21, herein referred to as an originator node device or originator lighting device 21, may detect the presence of the object or target 11 such as a pedestrian or a vehicle adjacent or next to it, by using a presence detection sensor (not shown) provided with the lighting device 21. After detecting the object, in a light on demand application, the originator lighting device 21 transmits an alerting message, comprising a lighting control command, to other lighting devices 23, 24, 25 in its neighbourhood, to inform these other lighting devices 23, 24, 25 of the presence of the object or target 11, such that the other lighting devices 23, 24, 25 may dim up their lighting level accordingly. The alerting message may comprise other commands or instructions for controlling one or more other electronic devices installed to the light pole, to provide services to the object 11.

It can be contemplated by those skilled in the art that several lighting devices may share a same presence detection sensor for detecting the presence of a moving object, as disclosed above.

The alerting message functions to alert other node devices in the vicinity of the originator node device of the presence of the moving object such that the other node devices may prepare the service that the moving object needs and/or according to a set application. It can be contemplated that the alerting message may comprise various commands or instructions for controlling the node devices receiving the alerting message.

For a lighting device receiving the alerting message, the alerting message may comprise an instruction for switching on the lighting device, or to dim up the light. For a node device arranged to provide geographic routing information to the moving object, the alerting message may be used to instruct a receiving node device to transmit geographic location information to a device passing by it.

The alerting message comprises a geographic location address of the originator light device 21, which may be obtained from a location detection device such as a Global Position System, GPS, device or other Global Navigation Satellite System, GNSS, such as termed GLONASS, Galileo, BeiDou, or regional navigation systems like QZSS, IRNSS or NavIC, provided with the originator lighting device 21.

As an alternative, the geographic location address may also be available to the lighting devices from a remote backend server or from a cloud device (not shown) which hold data related to geographic location addresses of all lighting devices stored in its storage device and may provide same to the lighting devices via a network connection upon request, for example.

A geographic location address of a node device may comprise geographic coordinates of the node device obtained by the GNSS device equipped with the node device. A geographic location address may also constitute, for example, a node serial number address correlated to the geographic location of the node device or any other identification for uniquely identifying a node device. As an example, lighting devices 22, 23, 21 and 24 may be serially numbered respectively as No. 1, 2, 3 and 4 lighting device along the road 18.

The alerting message also comprises a moving direction 12 of the object 11, indicating by an arrow in FIG. 2. The moving direction 12 may be detected by the presence detection sensor of the originator lighting device 21, by either relying directly on an output or subsequent outputs of the sensor, or by estimation based on a presence detection output of adjacent lighting devices, for example.

When the geographic location address of a node device is represented by geographic coordinates, the moving direction may be indicated by an increase or decrease in terms of one or both of the geographic coordinates of node devices detecting the object. On the other hand, the moving direction may be indicated as a change of node serial number for node devices detecting the object, which are addressed in a remote system with node serial numbers, for example. It is also possible to indicate the moving direction using a compass bearing.

In the specific example of FIG. 2, it is assumed that the originator node device 21 incorporates in the alerting message the moving direction 12 of the object 11, indicated by an increase in terms of a first coordinate along the direction of track 18.

Optionally, the alerting message may further comprise a moving speed of the object and a detection time of the object such as a timestamp indicating when the object is detected by a node device.

A node device may comprise an Open System Interconnections, OSI, based protocol stack arranged for providing Physical, PHY, layer functionality, Media Access Control, MAC, sub-layer functionality, Radio Link Control, RLC, layer functionality and so on. The alerting message may be comprised in the MAC sub-layer functionality of the node device.

Figure 3A:
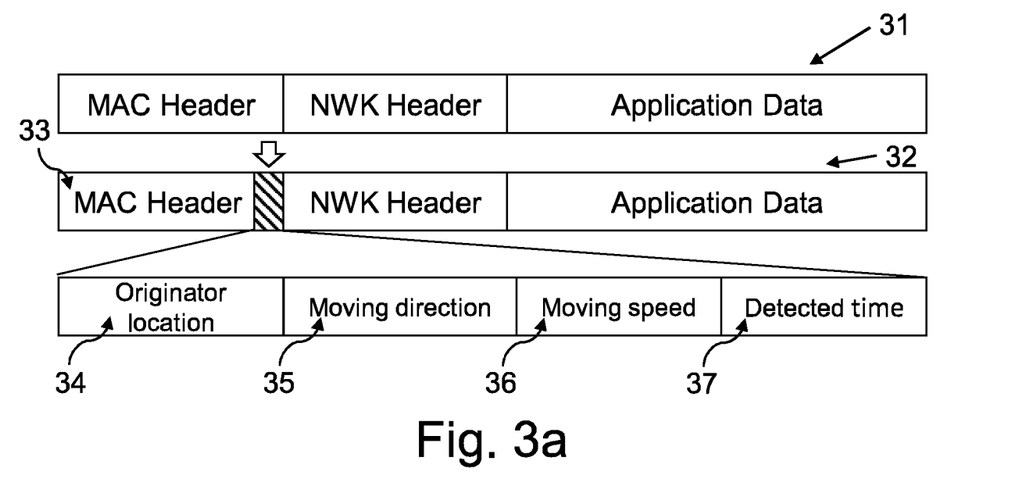
FIGS. 3a and 3b schematically illustrate embodiments of data frames comprising an alerting message, in accordance with the present disclosure.
Figure 3B:
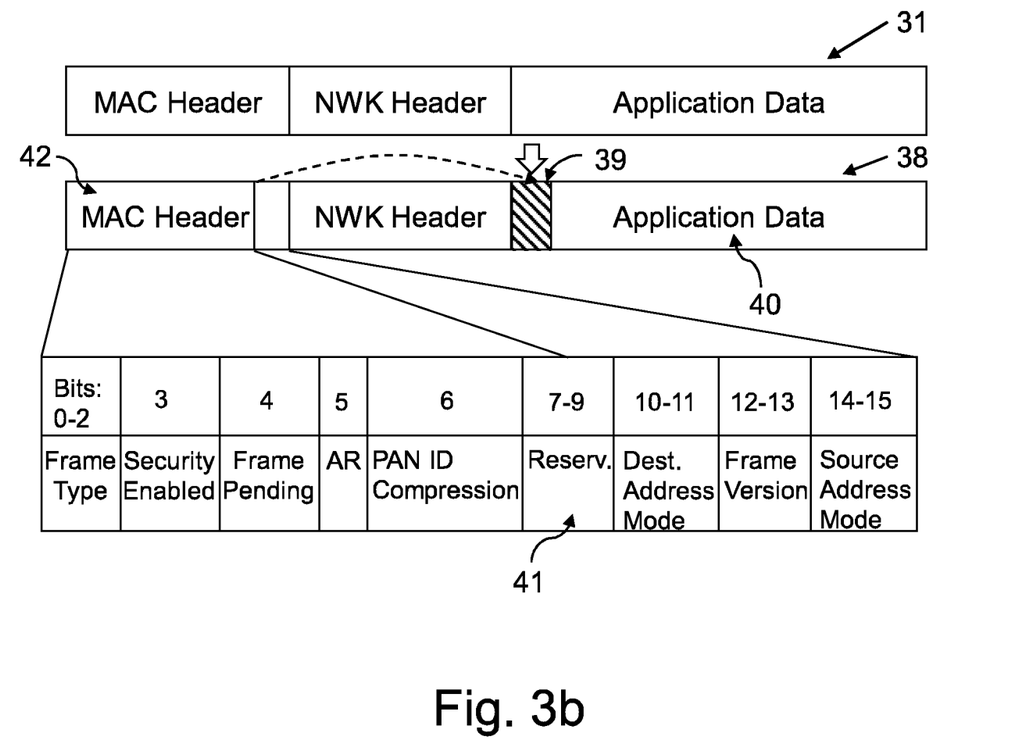

FIGS. 3a and 3b schematically illustrate a data frame 31 and two modified data frames 32, 38 each comprising the alerting message according to an embodiment of the present disclosure.

The information comprised in the alerting message according to the present disclosure may be inserted into a MAC header field 33 of the modified data frame 32, illustrated in more detail in FIG. 3a below. The MAC header field 33 of the modified data frame 32 comprises an originator location 34 indicating the geographic location address of the originator lighting device 21, the moving direction 35 and the moving speed 36 of the object 11, and a time stamp 37 indicating a clock time at which the object 11 is detected by a node device.

Alternatively, the above information may also be put into the application data field 40 of the modified data frame 38, illustrated in more detail in FIG. 3b. A hashed area 39 of the application data field 40 of the modified data frame 38 comprises the above information, while the reserved bits 7-9, indicated by reference numeral 41 of the MAC header field 42 are used to indicate the inclusion of such information in the application data 40.

Figure 4:
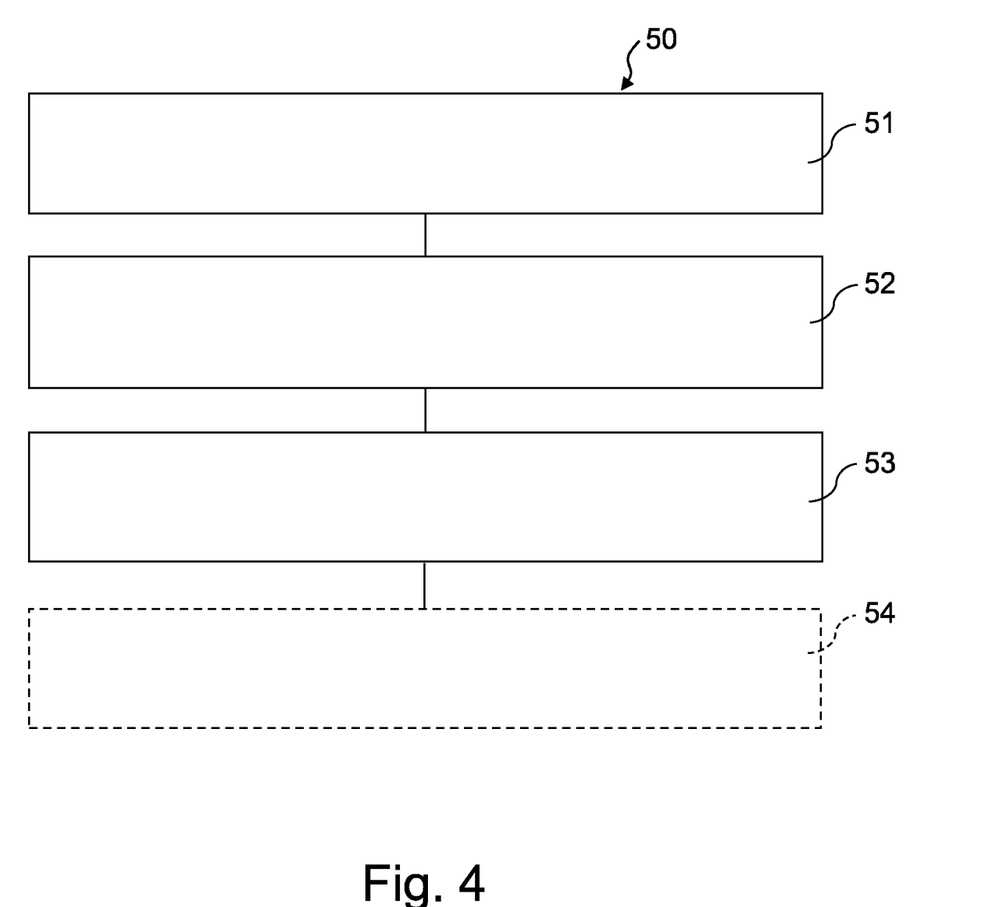
FIG. 4 schematically illustrates, in a flow chart type diagram, an embodiment of a method of alerting node devices in a network of operatively interconnected node devices according to the present disclosure.

FIG. 4 schematically illustrates, in a flow chart type diagram, an embodiment of a method 50 of alerting node devices in a network of operatively interconnected node devices for providing service to a moving object according to the present disclosure.

The method 50 starts with step 51, "Receiving by a node device an alerting message comprising a geographic location address of an originator node device and a moving direction of an object". At this step, a node device, such as lighting device 24 of FIG. 2, is receiving the alerting message transmitted by the originator lighting device 21. The alerting message may be transmitted through short range communication interfaces provided with the lighting devices 21, 24.

Next, at step 52, "Determining that the object is approaching the receiving node device based on geographic location addresses and moving direction of the object", the receiving lighting device 24 makes uses of its own geographic location address, the geographic location address of the originator lighting device 21 received with the alerting message, and the moving direction 12 of the object 11, to decide if the object 11 is approaching the receiving node device 24.

The determination may be performed as follows: first, the receiving node device 24 calculates a propagation direction of the alerting message by using the geographic location address of the originator lighting device 21 and the moving direction 12 of the object 11. Then the receiving node device decides 24 that it is downstream of the originator node device 21 along the propagation direction of the alerting message.

For the example of FIG. 2, from the geographic location address of the originator node device 21 and because the first coordinate increases while the object 11 moves, the node device 24 determines that the propagation direction of the alerting message is along the track 18 towards the right. As the first coordinate of the geographic location address of the node device 24 is higher than that of the originator node device 21, it is thereby evident that the receiving node device 24 is downstream of the originator node device 21 along the propagation direction of the alerting message.

It will be appreciated that the node device 22 will also receive the alerting message transmitted by node device 21. However, in determining the propagation direction of the alerting message in the same manner as disclosed above for node device 24, i.e. towards the right along the track 18, it will turn out that the receiving node device 22 is upstream of the originator node device 21 along the propagation direction of the alerting message.

As the lighting device 24 now is aware that the object 11 is approaching, at step 53, "Transmitting alerting message comprising geographic location address of originator node device and moving direction of the object", the receiving lighting device 24 relays the alerting message to other lighting devices 25, 26, 27 in its neighbourhood, such that the other lighting devices 25, 26, 27 may prepare the required lighting service before the object 11 arrives.

The lighting device 22, however, will not transmit the received alerting message as the object 11 is not moving towards this node device, in accordance with the present disclosure.

In particular, the node device 24 is a node device that has normal relay functions. The node device 24 only relays the message to other node devices under the condition that it normally would relay a received message and that it is on the moving direction of the object 11, that is, the object 11 is moving towards the node device 24. For any other scenarios, including a node device that normally relays a received message to other devices, but the node device is not in the moving direction of the object 11, and a node device which normally does not relay a message, the received message will not be relayed by such node devices. This will significantly reduce the number of relayed messages in the network.

When the node devices each comprise a sensor for detecting the presence of the moving object, for example, it is also possible to determine that the object is approaching the receiving node device by using detection times of the object as an indication of the moving direction of the object.

As an example, assume the node device 23 detects the presence of the object 11 at a first time point t1, and transmits a first alerting message comprising the geographic location of the node device 23 and the time point t1. Further, assume this first alerting message will be received by node device 24.

Next, the node device 21 detects the presence of the object 11 at time point t2, later than t1, and transmits a second alerting message including the geographic location of node device 21 and time point t2. This second alerting message will also be received by node device 24.

By comparing these two alerting messages, from the geographic location addresses of the respective node devices and the time points t1 and t2, the node device 24 can easily calculate that the second alerting message is transmitted later in time than the first alerting message and over a shorter geographic distance d2 than the first alerting message which is transmitted over the larger distance d1. Hence, the receiving node device 24 decides that the object 11 is moving towards or approaching it. That is, the distance between subsequently received alerting messages decreases.

The first alerting message transmitted by the node device 23 will also be received by the node device 22 as will be the second alerting message transmitted by the node device 21. From the received alerting messages, the node device 22 will calculate that the second alerting message is transmitted later in time than the first alerting message, however over a larger geographic distance d4 than the first alerting message that is transmitted over the shorter distance d3. Hence, the receiving node device 22 decides that the object 11 is moving away from it. That is, the distance between subsequently received alerting messages increases.

Assuming that the lighting or node device 24 has no object detection sensor, than same will transmit the alerting message in accordance with step 53, as disclosed above. The lighting device 22, however, will not transmit the received alerting message as the object 11 is not moving towards this node device, in accordance with the present disclosure.

The above determining step and calculations are performed in the MAC sub-layer of the receiving node device 24 and 22, where a MAC protocol handler extracts information comprised in the MAC header and processes the information accordingly. Alternatively, when the information is comprised in the application layer and indicated in the MAC header with reserved bits, the MAC protocol hander extract the information from the application layer based on the indication by the reserved bits and process the information in the same way.

Other node devices may follow the steps described above to decide whether to relay a received alerting message.

Those skilled in the art will appreciate that in this manner no scarce transmission resources are wasted in transmitting the alerting message to node devices that will not be involved in providing service to a moving object. The method as described above therefore prevents meaningless relay of alerting messages to further node devices in the network. As a result, interference to meaningful or useful messages may be reduced, and duty cycle restrictions by the relevant authorities may be met.

Transmission of the alerting message may be performed in a way known to those skilled in the art. As an example, with a mesh network, the transmission may be performed via either flooding or routing.

In transmitting the alerting message, the receiving node device can decide to transmit the message to lighting devices within a communication range of a few hops. This is for the purpose of ensuring reliable quality of communication.

Transmission range or distance and beam width of a transmitting node device may also be adjusted based on the movement of the moving object. As an example, for an object moving at a faster speed, the alerting message should be relayed to node devices further away such that those node devices may prepare the service in time.

On the other hand, for an object with a large physical dimension, the alerting message may be transmitted to a wider area, such that street lights on both sides of the road may be dimmed up for providing better lighting environment for the object, for example.

In practice the object 11 can turn from a first moving direction to a second moving direction. In the example of FIG. 2, the object 11 may turn from track 18 towards track 19 at the crossing having the lighting device 24 installed thereto, for example. In this case, at step 54, "Updating geographic location address of originator node device in the alerting message and moving direction of the object and transmitting the alerting message", a receiving node device can update the geographic location address of the originator lighting device and the moving direction of the object. This update information may be provided by a node device presently detecting the presence of the moving object.

In practice, updating of the message may comprise or be replaced by generating a new alerting message by a different node device having a sensor detecting the presence of the moving object 11.

It is noted that the propagation of an alerting message will be terminated when it reaches its target, or when no node device chooses to relay the message, one of the reasons being a receiving node device deciding that that no object is approaching.

Figure 5:
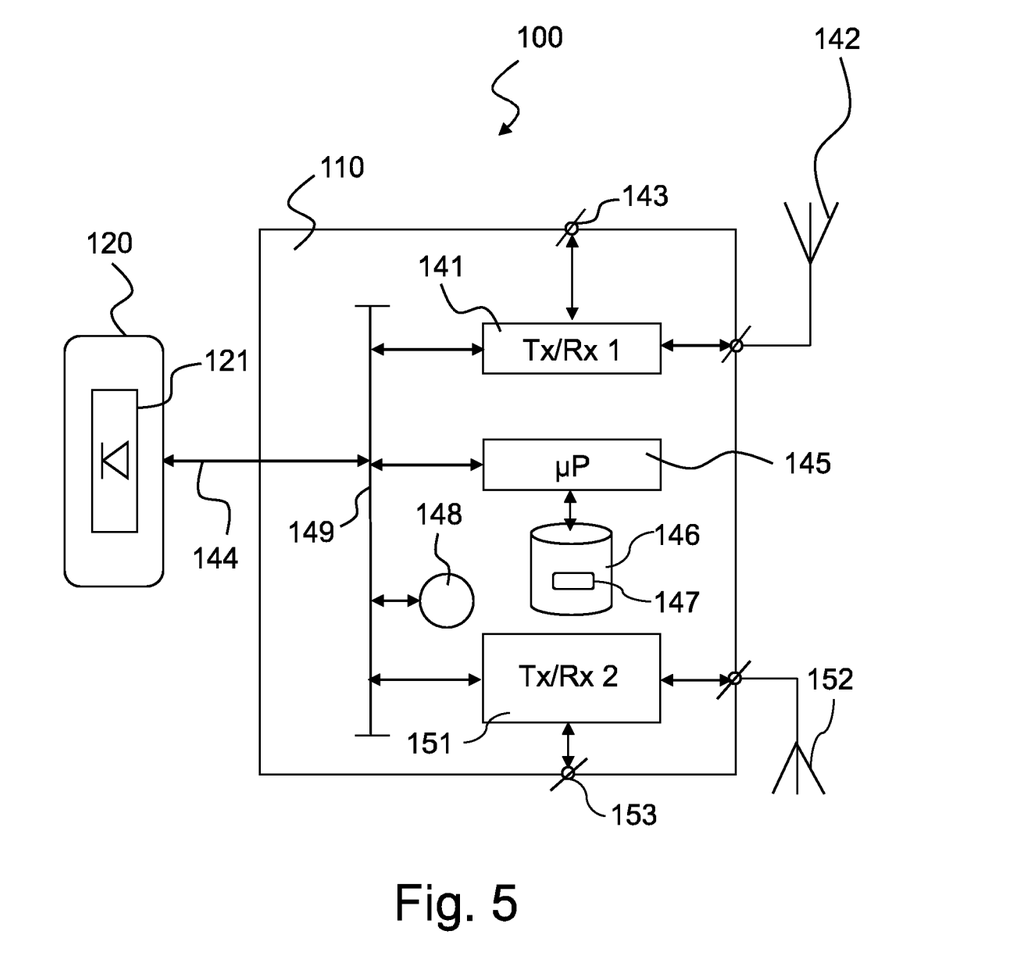
FIG. 5 illustrates, schematically, an embodiment of a node device arranged for operating in a network of operatively interconnected node devices, in accordance with the present disclosure.

FIG. 5 illustrates, schematically, a diagram of an embodiment of a node device or terminal device 100 arranged for operating in a network of operatively interconnected node devices, in accordance with the present disclosure.

The node device 100 comprises a control part or control device 110 and a load such as a lighting fixture or lighting device 120, comprising a lighting module 121, preferably a Light Emitting Diode, LED, lighting module or a plurality of LED lighting modules, operation of which may be controlled by the control device 110 from or through a remote control device, such as a remote or backend server (not shown), for example.

The control device 110 operates a short range communication interface 151, such as a second network adapter or transceiver, Tx/Rx 2, module arranged for short-range wireless 152 or wired 153 exchange of messages or data packets with another node device in the network, i.e. so called inter-node device communication. Network protocols for exchanging data by networked devices or nodes may comprise ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (or KNX based systems), and other proprietary protocols.

The control device 110 optionally further operates a long range communication interface 141, such as a first network adaptor or a transceiver, Tx/Rx 1, module, arranged for direct wireless message exchange or data packets 142 with a remote control device or backend server. The long range communication interface 141 typically operates according to a mobile communication system technology in a licensed frequency band, such as 2G/3G/4G/5G cellular communication, and other long-range wireless communication technologies, such as known as Long Range Wide Area Network, LoRaWAN, communication, for example. However, the long range communication interface 141 may also operate according to a proprietary wireless communication protocol or technology.

The long range communication interface 141 may also be arranged for wired message exchange 143, such as for data exchange over an Ethernet connection and the Internet, or the like.

The control device 110 further comprises at least one microprocessor, μP, or controller 145, and at least one data repository or storage or memory 146, among others for storing address information 147 of the node device itself and other node devices, such as identifiers, IDs, Media Access Control, MAC, addresses, geographic location data of the node device 110, and subscriber information of node devices. The repository 146 may also store the alerting message that the node device 100 receives from other node devices. Instead of the repository 146, a separate memory or storage accessible to the at least one processor or controller 145 may be provided.

Optionally, the node device 100 may comprise a sensor or a plurality of sensors 148, dedicated to or suitable for detecting the presence of a target or an object such as a pedestrian or a vehicle moving past or in the neighbourhood of the node device 100. Such as a presence detection sensor including a passive infrared sensor, PIR, or a microwave motion sensor having a radar device, a sound detection sensor, a temperature measurement sensor, a camera operating in the visible and/or infrared spectrum, etc. that can detect a position or the presence of the object.

The sensor or sensors 148 may also be arranged for obtaining the moving direction and possibly the moving speed of the object, for example by relying on its own outputs, such as the successive outputs from successive radar measurements, for example.

The at least one microprocessor or controller 145 communicatively interacts with and controls the long range communication interface 141, the short range communication interface 151, and the at least one repository or storage 146 via an internal data communication and control bus 149 of the control device 110. The at least one microprocessor or controller 145 may operate one or a plurality of load control algorithms or applications, such as a light on demand application discussed above and/or other smart or optimized lighting service profiles, and the protocol stack of the node device 100 comprising the MAC sub-layer functionality to perform the method of alerting node devices in the network described above.

The lighting fixture or lighting device 120 connects 144 to and is controlled from the data communication and control bus 149 by the at least one microprocessor or controller 110.

According to another embodiment of the present invention, the node device 100 comprises a receiving unit, a determining unit and a transmitting unit. The receiving unit configured to receive an alerting message comprising a moving direction of said object and a geographic location address of an originator node device 21, transmitting said alerting message. The determining unit configured to determine, based on its geographic location address, said geographic location address of said originator node device 21 and said moving direction 12, whether said object 11 is approaching said receiving node device 22, 23, 24, 25. The transmitting unit configured to transmit said alerting message comprising said geographic location address of said originator node device 21 and said moving direction 12 if it is determined that said object 11 is approaching said receiving node device 24, 25.

Those skilled in the art will appreciate that any electric load may be connected 144 to the control bus 149 other than or in addition to a lighting fixture or lighting device 120, such as an access point device or a geographic routing device.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of alerting node devices in a network of operatively interconnected node devices by transmitting an alerting message, said alerting message being a broadcast message and related to a service to be provided by said node devices to a moving object, each node device comprising a geographic location address of said node device, said method comprising:
  receiving, by a node device, an alerting message comprising a moving direction of said object and a geographic location address of an originator node device, transmitting said alerting message;
  determining, based on its geographic location address, said geographic location address of said originator node device and said moving direction, by said receiving node device, whether said object is approaching said receiving node device, and
  transmitting, by said receiving node device, said alerting message comprising said geographic location address of said originator node device and said moving direction if it is determined that said object is approaching said receiving node device.

2. The method according to claim 1, wherein said alerting message is generated by said originator node device in response to detection of said object by a sensor of said originator node device.

3. The method according claim 1, wherein said node devices are arranged along at least one track, said method further comprising updating, in said alerting message, by a receiving node device, said geographic location address of said originator node device and said moving direction of said object when this receiving node device determines that said object moves in a different direction than indicated in said received alerting message.

4. The method according to claim 3, wherein said alerting message is updated by said receiving node device in response to detection of said object by a sensor of said receiving node device.

5. The method according to claim 1, wherein a geographic location address of a node device is obtained from one of a geographic location detection module of said node device and preconfigured data available to said node device.

6. The method according to claim 1, wherein each node device operates in accordance with a Medium Access Control (MAC) data processing protocol sub-layer, wherein said geographic location address of said originator node device and said moving direction of said object are comprised in at least one of a MAC header and application data of said alerting message for processing by said MAC data processing protocol sub-layer of said receiving node device.

7. The method according to claim 6, wherein said determining is performed by said MAC data processing protocol sub-layer.

8. The method according to claim 1, wherein said determining further comprises:
  calculating a propagation direction of said alerting message based on said geographic location address of said originator node device and said moving direction of said object, and
  deciding that said receiving node device is in downstream of said originator node device along said propagation direction.

9. The method according to claim 1, wherein said network is a mesh network, and said transmitting comprises one of flooding and routing of said alerting message.

10. The method according to claim 1, wherein said alerting message is transmitted to node devices within a pre-set number of hops of said receiving node device, in particular wherein said alerting message comprises a moving speed of said object, wherein said pre-set number of hops is based on said moving speed of said object.

11. The method according to claim 1, wherein said node devices comprise at least one of smart pole devices and lighting devices providing at least one of a lighting service, a network access service and a geographic routing service to said object.

12. The method according to claim 11, wherein node devices receiving said alerting message provide a luminance level dependent on geographic distances between said receiving node devices and said node device transmitting said alerting message.

13. A node device arranged for receiving and transmitting an alerting message in a network of operatively interconnected node devices, said alerting message being a broadcast message and related to a service to be provided by said node devices to a moving object, each node device comprising a geographic location address of itself, said node device comprises:
  a receiving unit configured to receive an alerting message comprising a moving direction of said object and a geographic location address of an originator node device,
  a transmitting unit configured to transmit said alerting message;
  a determining unit configured to determine, based on its geographic location address, said geographic location address of said originator node device and said moving direction, whether said object is approaching said receiving node device, and
  the transmitting unit configured to transmit said alerting message comprising said geographic location address of said originator node device and said moving direction if it is determined that said object is approaching said receiving node device;
  wherein said node device comprising at least one of a smart pole device and a lighting device comprising at least one luminaire.

14. The node device of claim 13, comprising a Medium Access Control (MAC) data processing protocol sub-layer, wherein said geographic location address of said originator node device and said moving direction are comprised in at least one of a MAC header and application data of said alerting message for processing by said MAC data processing protocol sub-layer of said node device.

15. A computer program product, comprising a non-transitory computer readable storage medium storing instructions which, when executed on at least one processor, cause said at least one processor to carry out the method according to claim 1.

\* \* \* \* \*

UNITED STATES PATENT AND TRADEMARK OFFICE
CERTIFICATE OF CORRECTION

| | | |
|---|---|---|
| PATENT NO. | : 11,974,191 B2 | |
| APPLICATION NO. | : 17/788320 | |
| DATED | : April 30, 2024 | |
| INVENTOR(S) | : Lei Feng, Chang Jie Wang and Gong Ming Wei | |

It is certified that error appears in the above-identified patent and that said Letters Patent is hereby corrected as shown below:

In the Claims

In Claim 1, Column 15, Line 29 delete "transmitting said alerting message;"

Signed and Sealed this
Twenty-ninth Day of October, 2024

Katherine Kelly Vidal
*Director of the United States Patent and Trademark Office*